United States Patent
Kasslin et al.

(10) Patent No.: US 7,693,486 B2
(45) Date of Patent: *Apr. 6, 2010

(54) DISTRIBUTED MULTIRADIO CONTROLLER

(75) Inventors: Mika Kasslin, Espoo (FI); Niko Kiukkonen, Veikkola (FI)

(73) Assignee: Nokia Corporation, Espoo (FI)

( * ) Notice: Subject to any disclaimer, the term of this patent is extended or adjusted under 35 U.S.C. 154(b) by 890 days.

This patent is subject to a terminal disclaimer.

(21) Appl. No.: 11/431,542

(22) Filed: May 11, 2006

(65) Prior Publication Data

US 2007/0263710 A1    Nov. 15, 2007

(51) Int. Cl.
*H04B 7/00* (2006.01)

(52) U.S. Cl. .............. 455/41.2; 455/450; 455/507; 455/552.1; 455/556.1; 455/557; 370/236; 370/328; 370/332; 370/338; 370/343; 375/222; 375/356

(58) Field of Classification Search .......... 370/310, 370/338, 334, 343, 236, 328, 332, 350; 455/41.2, 455/450, 452, 1, 454, 507, 552.1
See application file for complete search history.

(56) References Cited

U.S. PATENT DOCUMENTS

| | | | |
|---|---|---|---|
| 6,389,059 B1 * | 5/2002 | Smith et al. ............ | 375/141 |
| 6,654,896 B1 | 11/2003 | Saunders et al. | |
| 6,707,867 B2 | 3/2004 | Diepstraten et al. | |
| 6,775,558 B1 | 8/2004 | Ranta et al. | |
| 6,782,240 B1 * | 8/2004 | Tabe ..................... | 455/66.1 |
| 7,496,060 B2 | 2/2009 | Ramirez et al. | |
| 2002/0093962 A1 | 7/2002 | Lo et al. | |
| 2003/0060206 A1 | 3/2003 | Sointula et al. | |
| 2003/0083095 A1 | 5/2003 | Liang | |
| 2004/0003307 A1 | 1/2004 | Tsuji | |
| 2004/0048572 A1 | 3/2004 | Godfrey | |
| 2004/0141525 A1 | 7/2004 | Bhushan et al. | |
| 2004/0190482 A1 * | 9/2004 | Baum et al. ............ | 370/347 |

(Continued)

FOREIGN PATENT DOCUMENTS

EP    0459247 A2    12/1991

(Continued)

OTHER PUBLICATIONS

U.S. Appl. No. 11/431,541, filed May 11, 2006, Kasslin et al.

(Continued)

*Primary Examiner*—Dwayne Bost
*Assistant Examiner*—Inder P Mehra
(74) *Attorney, Agent, or Firm*—Locke Lord Bissell & Liddell

(57) ABSTRACT

A system for managing the simultaneous operation of a plurality of radio modems in a single wireless communication device (WCD). The multiradio control may be integrated into a WCD as a subsystem responsible for scheduling wireless communications by temporarily enabling or disabling a plurality of radio modems. The multiradio control system may include a plurality of distributed control components, some or all of which are coupled to a dedicated radio interface. The radio interface is dedicated to quickly conveying delay sensitive information to and from the distributed control components. This information may be requested by any or all of the distributed control components, or provided by any or all of the radio modems if a change occurs during operation.

29 Claims, 17 Drawing Sheets

U.S. PATENT DOCUMENTS

| | | |
|---|---|---|
| 2005/0018706 A1 | 1/2005 | Myojo |
| 2005/0048985 A1 | 3/2005 | Haartsen |
| 2005/0114723 A1 | 5/2005 | Ho et al. |
| 2005/0180427 A1 | 8/2005 | Eriksson et al. |
| 2006/0030353 A1 | 2/2006 | Jun |
| 2006/0068837 A1* | 3/2006 | Malone .................. 455/552.1 |
| 2006/0092910 A1* | 5/2006 | Dertz et al. ................. 370/348 |
| 2007/0136509 A1* | 6/2007 | Agami ....................... 711/103 |
| 2007/0205896 A1 | 9/2007 | Beber et al. |
| 2009/0029710 A1* | 1/2009 | Ochiai et al. ............... 455/450 |

FOREIGN PATENT DOCUMENTS

| | | |
|---|---|---|
| EP | 1355224 A2 | 10/2003 |
| EP | 1583295 A2 | 5/2005 |
| GB | 2399475 A | 9/2004 |
| GB | 2412817 A | 5/2005 |

OTHER PUBLICATIONS

U.S. Appl. No. 11/560,561, filed Nov. 16, 2006, Reunamaki et al.
U.S. Appl. No. 11/283,792, filed Nov. 22, 2004.
International Search Report for International Application No. PCT/IB2007/001192 dated Dec. 21, 2007.

* cited by examiner

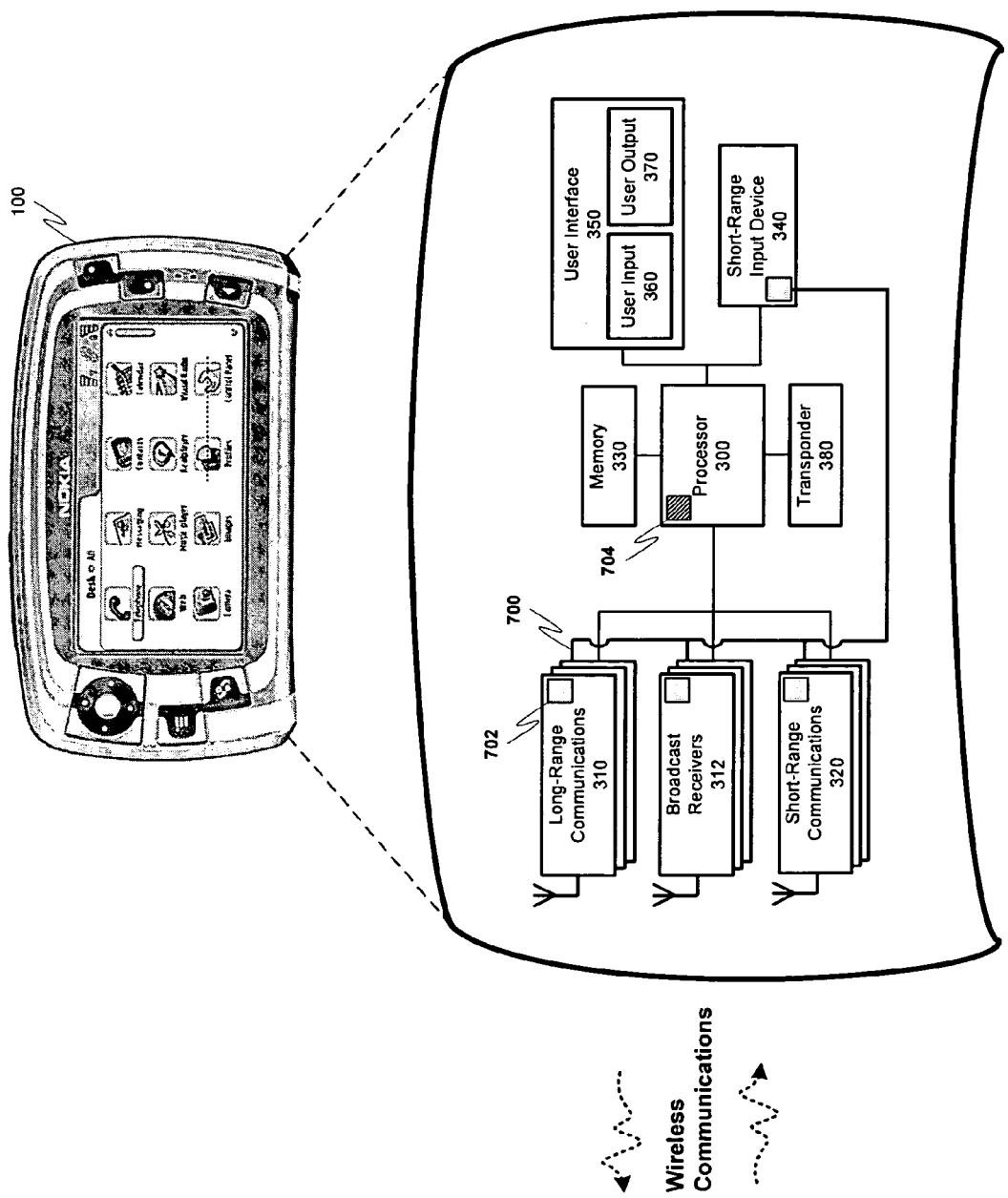

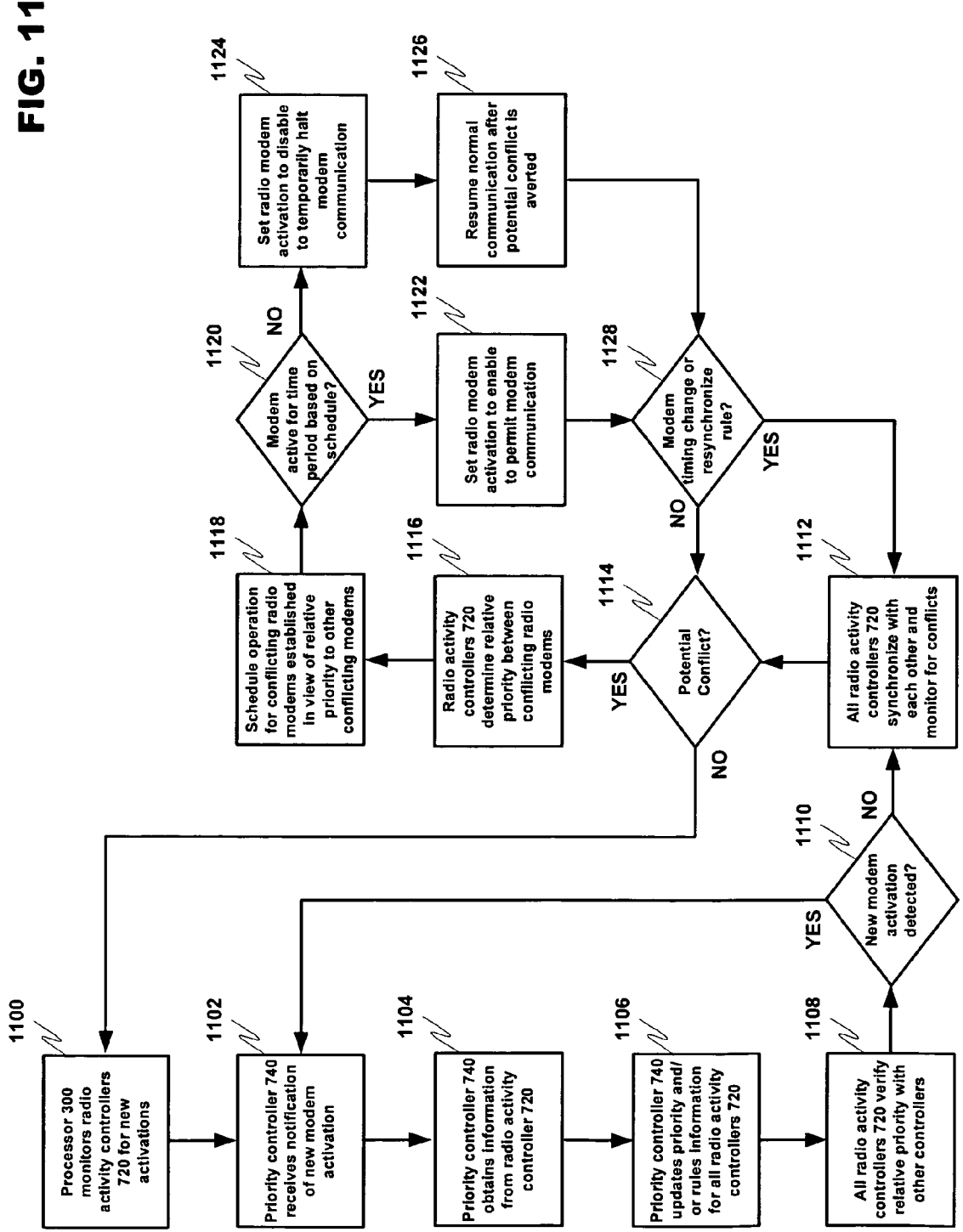

DISTRIBUTED MULTIRADIO CONTROLLER

RELATED CASES

This Application is related to application Ser. No. 11/431,541, filed May 11, 2006, entitled "MULTIRADIO CONTROL INTERFACE" and application Ser. No. 11/431,706, filed May 11, 2006, entitled "MULTIRADIO CONTROL INTERFACE ELEMENT IN MODEM", both of which are assigned to Nokia Corporation.

BACKGROUND OF THE INVENTION

The present invention relates to a system for managing multiple radio modems incorporated within a wireless communication device, and more specifically to a distributed multiradio control system for scheduling a plurality of active radio modems so as to avoid communication conflicts.

DESCRIPTION OF PRIOR ART

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

More recently, manufacturers have also began to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Device manufacturers are continuing to incorporate as many of the previously indicated exemplary communication features as possible into wireless communication devices in an attempt to bring powerful, "do-all" devices to market. Devices incorporating long-range, short-range and machine readable communication resources also often include multiple mediums for each category. This allows a communication device to flexibly adjust to its surroundings, for example, communicating both with a WLAN access point and a Bluetooth™ communication accessory, possibly at the same time.

Given the large array communications options compiled into one device, it is foreseeable that a user will want to employ a WCD to its full potential when replacing other productivity related devices. For example, a user may use a high powered WCD to replace other traditional, more cumbersome phones, computers, etc. In these situations, a WCD may be communicating simultaneously over numerous different wireless mediums. A user may use multiple peripheral Bluetooth™ devices (e.g., a headset and a keyboard) while having a voice conversation over GSM and interacting with a WLAN access point in order to access an Internet website. Problems may occur when these simultaneous communications cause interference with each other. Even if a communication medium does not have an identical operating frequency as another medium, a radio modem may cause extraneous interference to another medium. Further, it is also possible for the combined effects of two or more simultaneously operating radios to create intermodulation effects to another bandwidth due to harmonic effects. These disturbances may cause errors resulting in the required retransmission of lost packets, and the overall degradation of performance for one or more communication mediums.

The utility of a communication device equipped with the ability to communicate over multiple wireless communication mediums is greatly hindered if these communications can only be employed one at a time. Therefore, what is needed is a system to manage these various communication mediums so that they can function simultaneously with a negligible impact in performance. The system should be able to identify and understand the functionality of each wireless medium, and should be able to quickly react on changing conditions in the environment and control each medium so that interference is minimized.

SUMMARY OF INVENTION

The present invention includes a terminal, method, computer program, system and chipset for managing the simultaneous operation of a plurality of radio modems embedded in the same wireless communication device. The operations of these radio modems may be directly controlled by a multiradio control system also integrated into the same wireless device.

The control aspects of the multiradio control system (MCS) may distributed amongst various modules within the WCD. These distributed components may communicate with each other through either a communication interface common to the general control system of the WCD (common interface), or alternatively, they may utilize a specialized interface dedicated to transactions related to the multiradio control system (MCS interface). While the common interface may be utilized to convey information between the distributed control components, this mode of communication may suffer from communication delays due to ordinary traffic in the master control system (e.g., traffic from multiple running applications, user interactions, etc.). However, the MCS interface directly couples the distributed control components of the MCS, and may allow the quick transmission of delay sensitive operational information and control commands regardless of master control system traffic.

The distributed control components of the MCS may utilize both delay tolerant information and delay sensitive information, received from both the common interface system and the dedicated MCS interface system, to control overall communications for the WCD. The MCS control components may coordinate their resources in monitoring active wireless communications to determine if a potential conflict exists. In order to avoid a conflict, the MCS may provide scheduling using activity control commands, communicated via the dedicated MCS interface, that enable or disable various radio modems for one or more periods of time.

DESCRIPTION OF DRAWINGS

The invention will be further understood from the following detailed description of a preferred embodiment, taken in conjunction with appended drawings, in which:

FIG. 7A discloses an exemplary structural description of a wireless communication device including a multiradio control system in accordance with at least one embodiment of the present invention.

FIG. 11 discloses a flowchart explaining an exemplary process by which a multiradio control system manages a plurality of radio modems when a potential communication conflict exists in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks.

Figure 1:
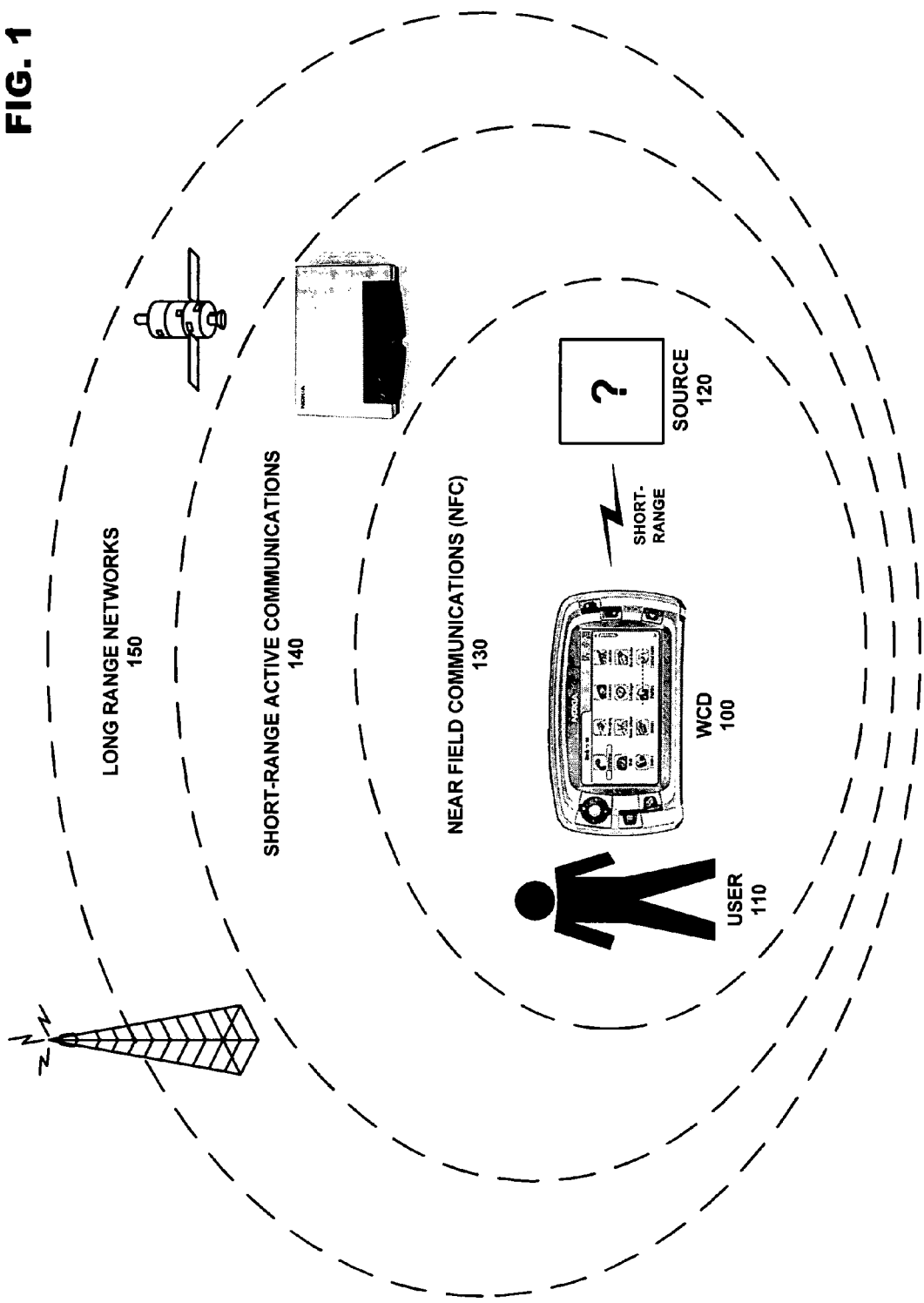
FIG. 1 discloses an exemplary wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes applications wherein the sending and receiving devices are both active. An exemplary situation would include user 110 coming within effective transmission range of a Bluetooth™, WLAN, UWB, WUSB, etc. access point. The amount of information to be conveyed is unlimited, except that it must all be transferred in the time when user 110 is within effective transmission range of the access point. This duration is extremely limited if the user is, for example, strolling through a shopping mall or walking down a street. Due to the higher complexity of these wireless networks, additional time is also required to establish the initial connection to WCD 100, which may be increased if there are many devices queued for service in the area proximate to the access point. The effective transmission range of these networks depends on the technology, and may be from 32 ft. to over 300 ft.

Long-range networks 150 are used to provide virtually uninterrupted communication coverage for WCD 100. Land-based radio stations or satellites are used to relay various communications transactions worldwide. While these systems are extremely functional, the use of these systems are often charged on a per-minute basis to user 110, not including additional charges for data transfer (e.g., wireless Internet access). Further, the regulations covering these systems cause additional overhead for both the users and providers, making the use of these systems more cumbersome.

In view of the above, it becomes easy to understand the need for a variety of different communication resources combined into a single WCD. Since these types of devices are being used as replacements for a variety of conventional communications means, including land-land telephones, low-functionality cellular handsets, laptops enabled with wireless communications, etc., the devices must be able to easily adapt to a variety of different applications (e.g., voice communications, business programs, GPS, Internet communications, etc.) in a variety of different environments (e.g. office, automobile, outdoors, arenas, shops, etc.)

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
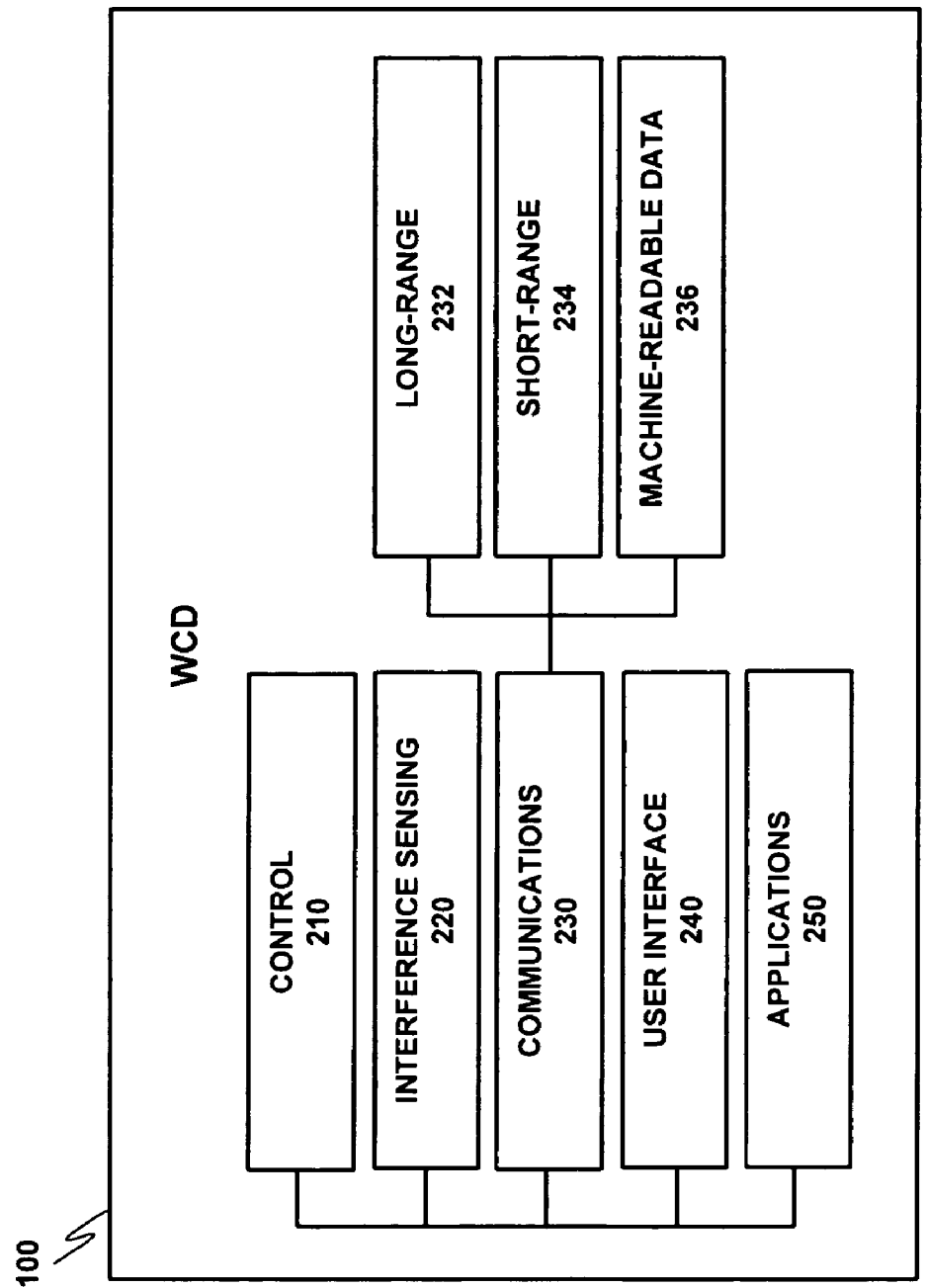
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
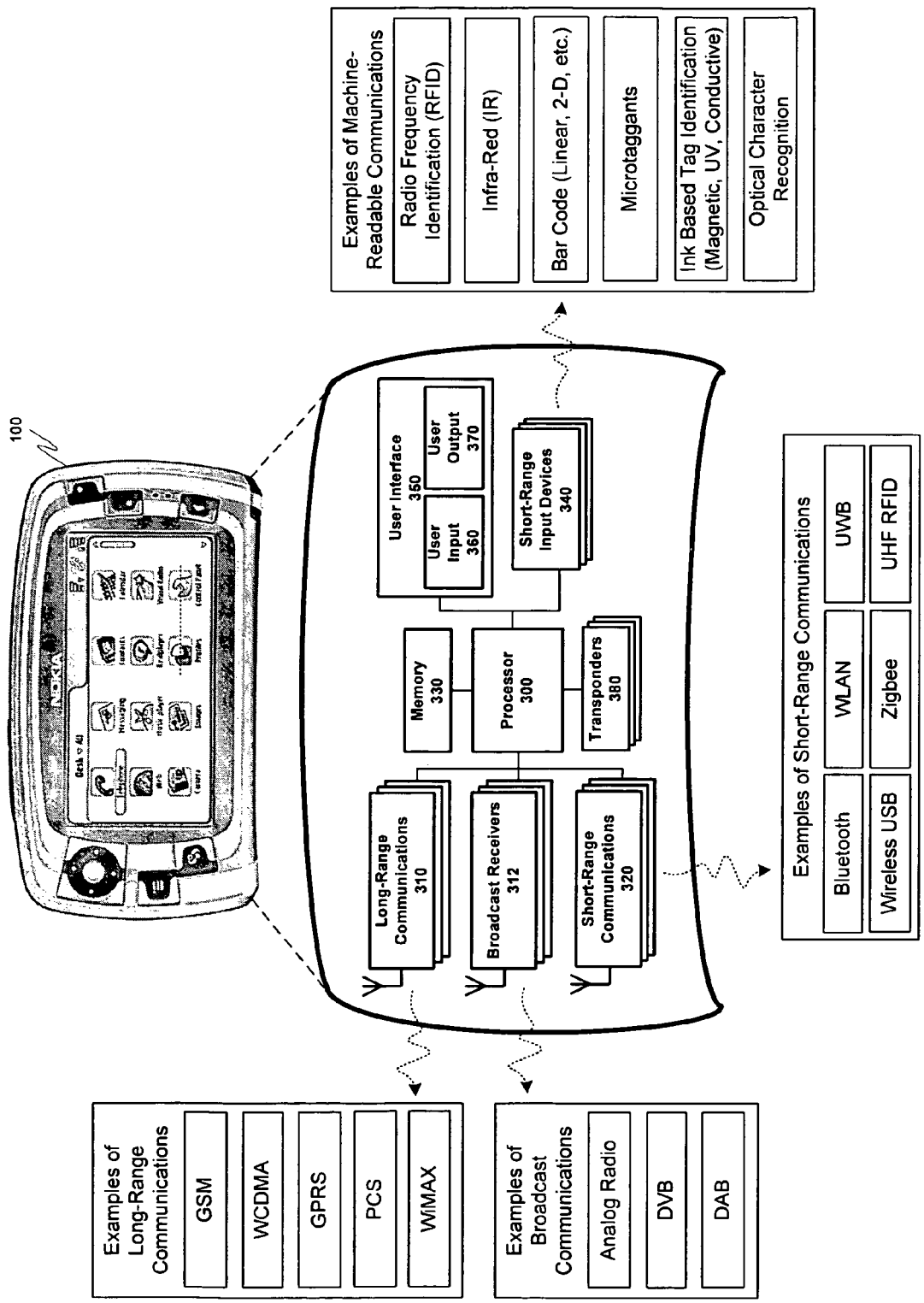
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 312, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 312, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. As disclosed in FIG. 3, Long-range communications 310 may be composed of one or more subsystems supporting various long-range communications mediums. These subsystems may, for example, be radio modems enabled for various types of long-range wireless communication.

As a subset of long-range communications 310, or alternatively operating as an independent module separately connected to processor 300, broadcast receivers 312 allows WCD 100 to receive transmission messages via mediums such as Analog Radio, Digital Video Broadcast for Handheld Devices (DVB-H), Digital Audio Broadcasting (DAB), etc. These transmissions may be encoded so that only certain designated receiving devices may access the transmission content, and may contain text, audio or video information. In at least one example, WCD 100 may receive these transmissions and use information contained within the transmission signal to determine if the device is permitted to view the received content. As in the case of long-range communications 310, broadcast receivers 312 may be comprised of one or more radio modems utilized to receive a variety of broadcast information.

Short-range communications 320 is responsible for functions involving the exchange of information across short-range wireless networks. As described above and depicted in FIG. 3, examples of such short-range communications 320 are not limited to Bluetooth™, WLAN, UWB, Zigbee, UHF RFID, and Wireless USB connections. Accordingly, short-range communications 320 performs functions related to the establishment of short-range connections, as well as processing related to the transmission and reception of information via such connections. Short-range communications 320 may be composed of one or more subsystems made up of, for example, various radio modems employed to communicate via the previously indicated assortment of short range wireless mediums.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include a multitude of optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device which may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Exemplary Operation of a Wireless Communication Device Including Potential Interference Problems Encountered.

Figure 4:
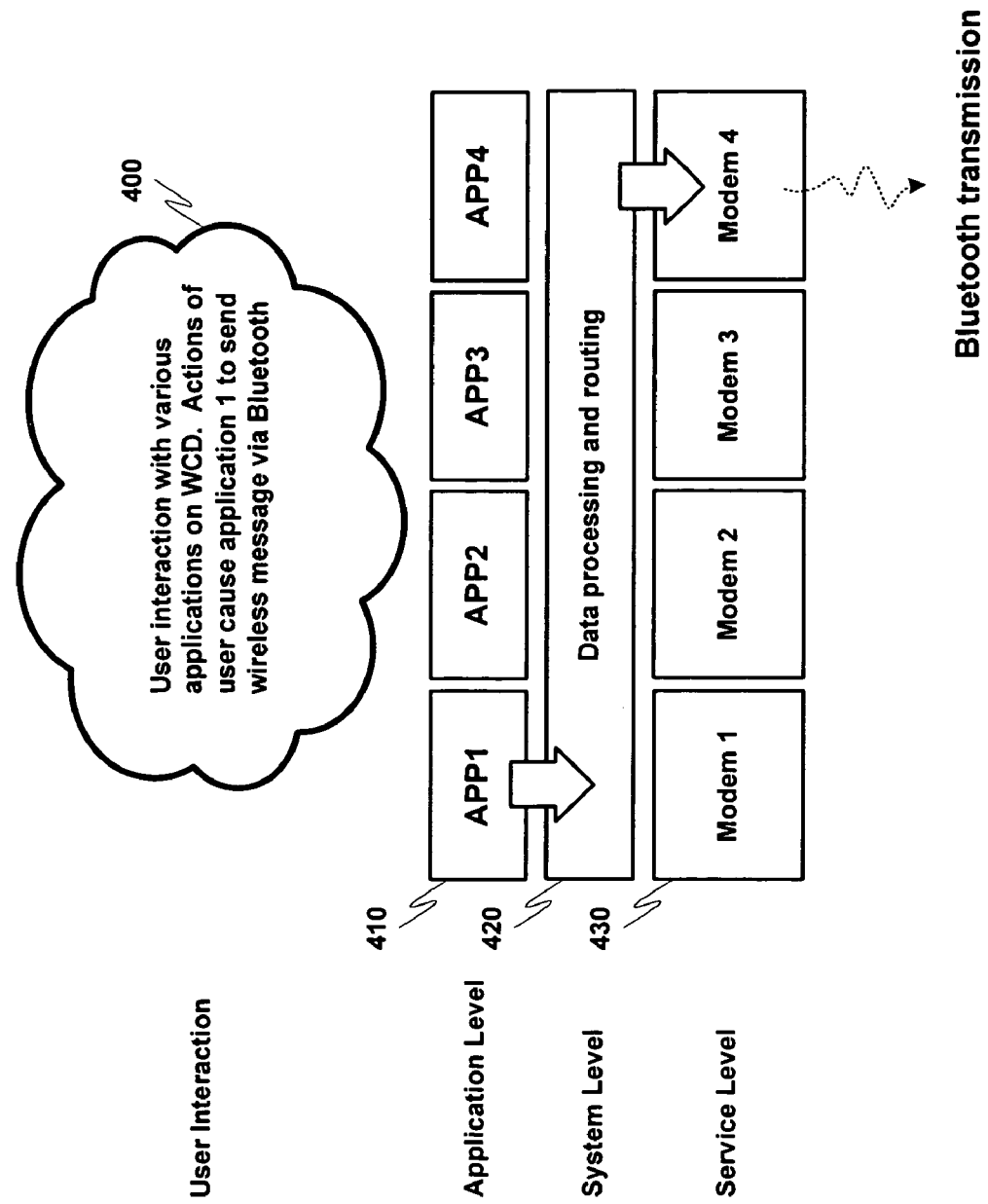
FIG. 4 discloses an exemplary operational description of a wireless communication device utilizing a wireless communication medium in accordance with at least one embodiment of the present invention.

FIG. 4 discloses a stack approach to understanding the operation of a WCD. At the top level 400, user 110 interacts with WCD 100. The interaction involves user 110 entering information via user input 360 and receiving information from user output 370 in order to activate functionality in application level 410. In the application level, programs related to specific functionality within the device interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require information to be sent from or received into WCD 100. In the example of FIG. 4, data is requested to be sent to a recipient device via Bluetooth™ communication. As a result, application level 410 may then call resources in the system level to initiate the required processing and routing of data.

System level 420 processes data requests and routes the data for transmission. Processing may include, for example, calculation, translation, conversion and/or packetizing the data. The information may then be routed to an appropriate communication resource in the service level. If the desired communication resource is active and available in service level 430, the packets may be routed to a radio modem for delivery via wireless transmission. There may be a plurality of modems operating using different wireless mediums. For example, in FIG. 4, modem 4 is activated and able to send packets using Bluetooth™ communication. However, a radio modem (as a hardware resource) need not be dedicated only to a specific wireless medium, and may be used for different types of communication depending on the requirements of the wireless medium and the hardware characteristics of the radio modem.

Figure 5:
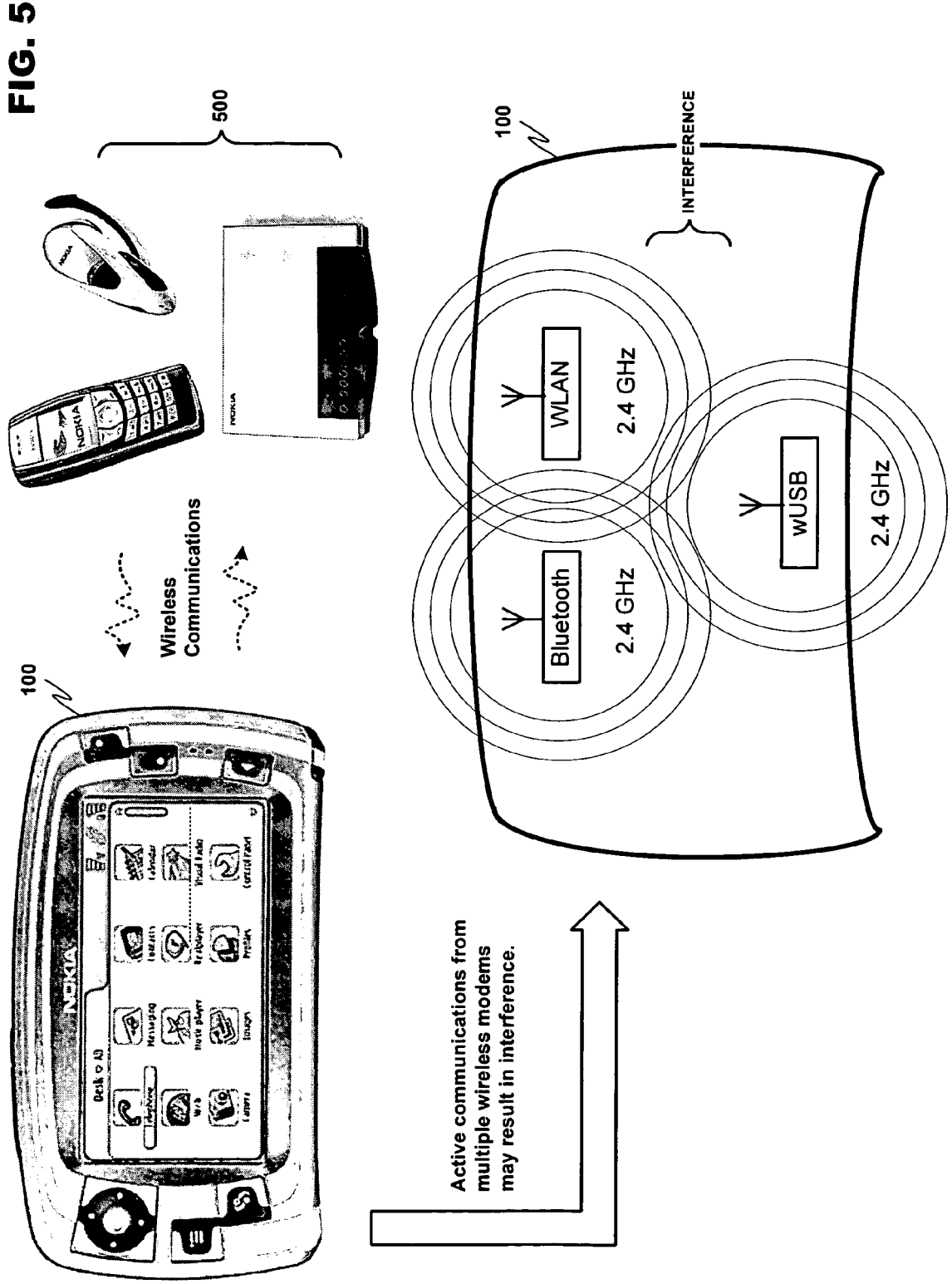
FIG. 5 discloses an operational example wherein interference occurs when utilizing multiple radio modems simultaneously within the same wireless communication device.

FIG. 5 discloses a situation wherein the above described exemplary operational process may cause more than one radio modem to become active. In this case, WCD 100 is both transmitting and receiving information via wireless communication over a multitude of mediums. WCD 100 may be interacting with various secondary devices such as those grouped at 500. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously. As further shown in FIG. 5, multiple modems operating simultaneously may cause interference for each other. Such a situation may be encountered when WCD 100 is communicating with more than one external device (as previously described). In an exemplary extreme case, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 5, would cause packets to be lost and the need for retransmission of these lost packets. Retransmission requires that future time slots be used to retransmit lost information, and therefore, overall communications performance will at least be reduced, if the signal is not lost completely. The present invention, in at least one embodiment, seeks to manage such situations where communications are occurring simultaneously so that anticipated interference is minimized or totally avoided, and as a result, both speed and quality are maximized.

IV. A Wireless Communication Device Including a Multiradio Controller.

In an attempt to better manage communications in WCD 100, an additional controller dedicated to managing wireless communications may be introduced. WCD 100, as pictured in FIG. 6A, includes a multiradio controller (MRC) 600. MRC 600 is coupled to the master control system of WCD 100. This coupling enables MRC 600 to communicate with radio modems or other similar devices in communications modules 310 312, 320 and 340 via the master operating system of WCD 100. While this configuration may in some cases improve overall wireless communications efficiency for WCD 100, problems may occur when WCD 100 becomes busy (e.g., when the control system of WCD 100 is employed in multitasking many different simultaneous operations, both communications and non-communications related).

Figure 6A:
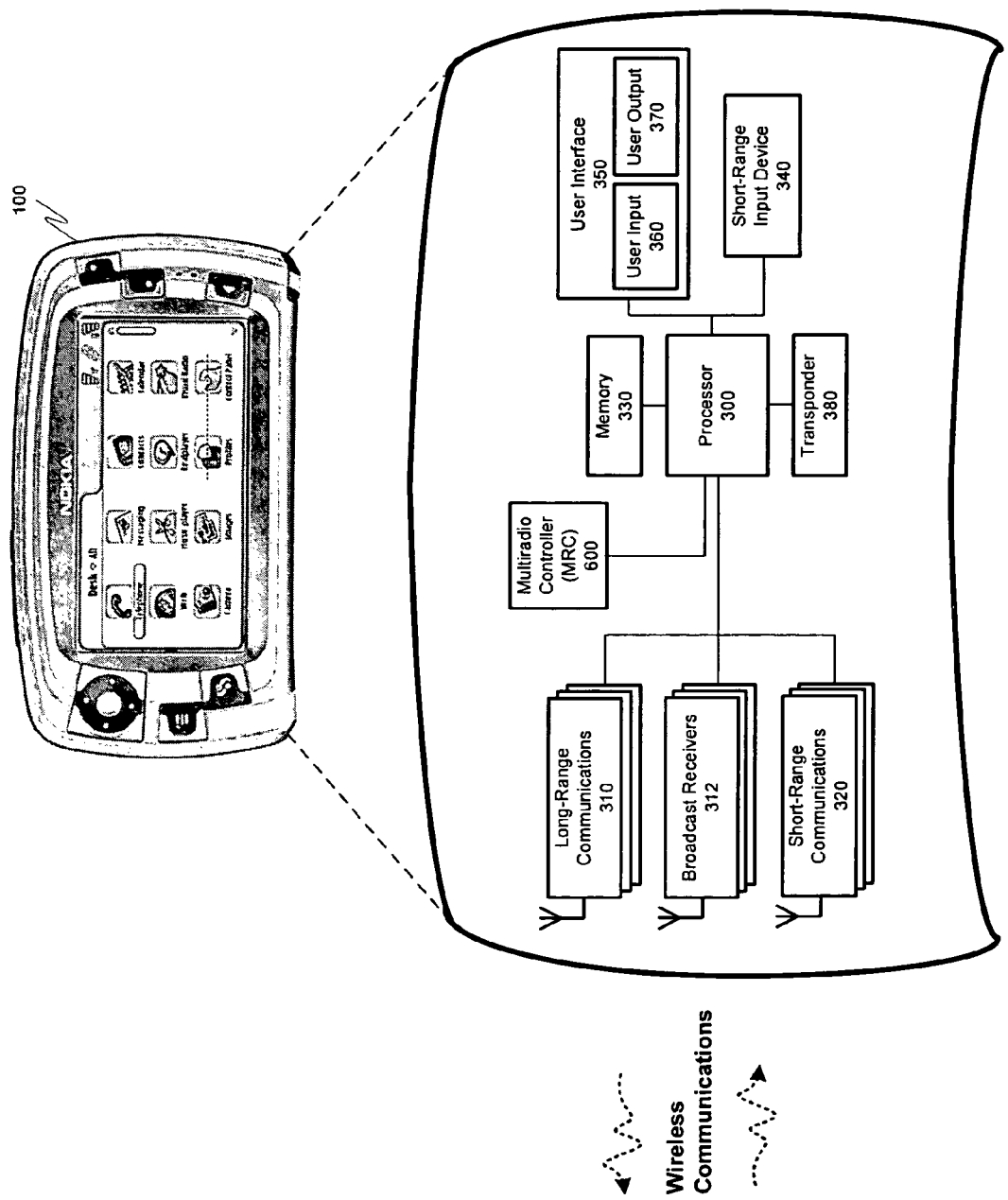
FIG. 6A discloses an exemplary structural description of a wireless communication device including a multiradio controller in accordance with at least one embodiment of the present invention.
Figure 6B:
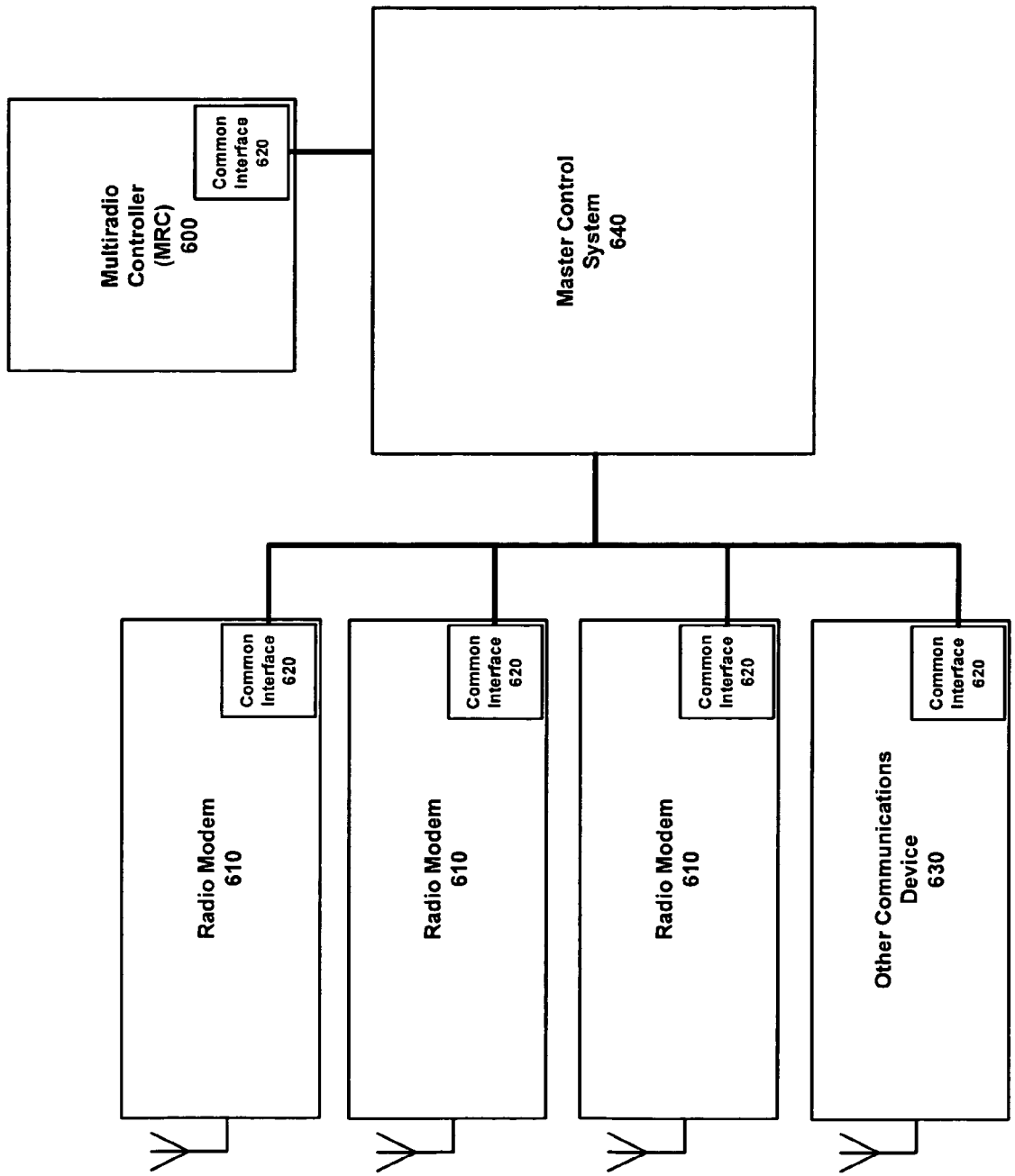
FIG. 6B discloses a more detailed structural diagram of FIG. 6A including the multiradio controller and the radio modems.

FIG. 6B discloses in detail at least one embodiment of WCD 100, which may include multiradio controller (MRC) 600 introduced in FIG. 6A. MRC 600 includes common interface 620 by which information may be sent or received through master control system 640. Further, each radio modem 610 or similar communication device 630, for example an RFID scanner for scanning machine-readable information, may also include some sort of common interface 620 for communicating with master control system 640. As a result, all information, commands, etc. occurring between radio modems 610, similar devices 630 and MRC 600 are conveyed by the communications resources of master control system 640. The possible effect of sharing communications resources with all the other functional modules within WCD 100 will be discussed with respect to FIG. 6C.

Figure 6C:
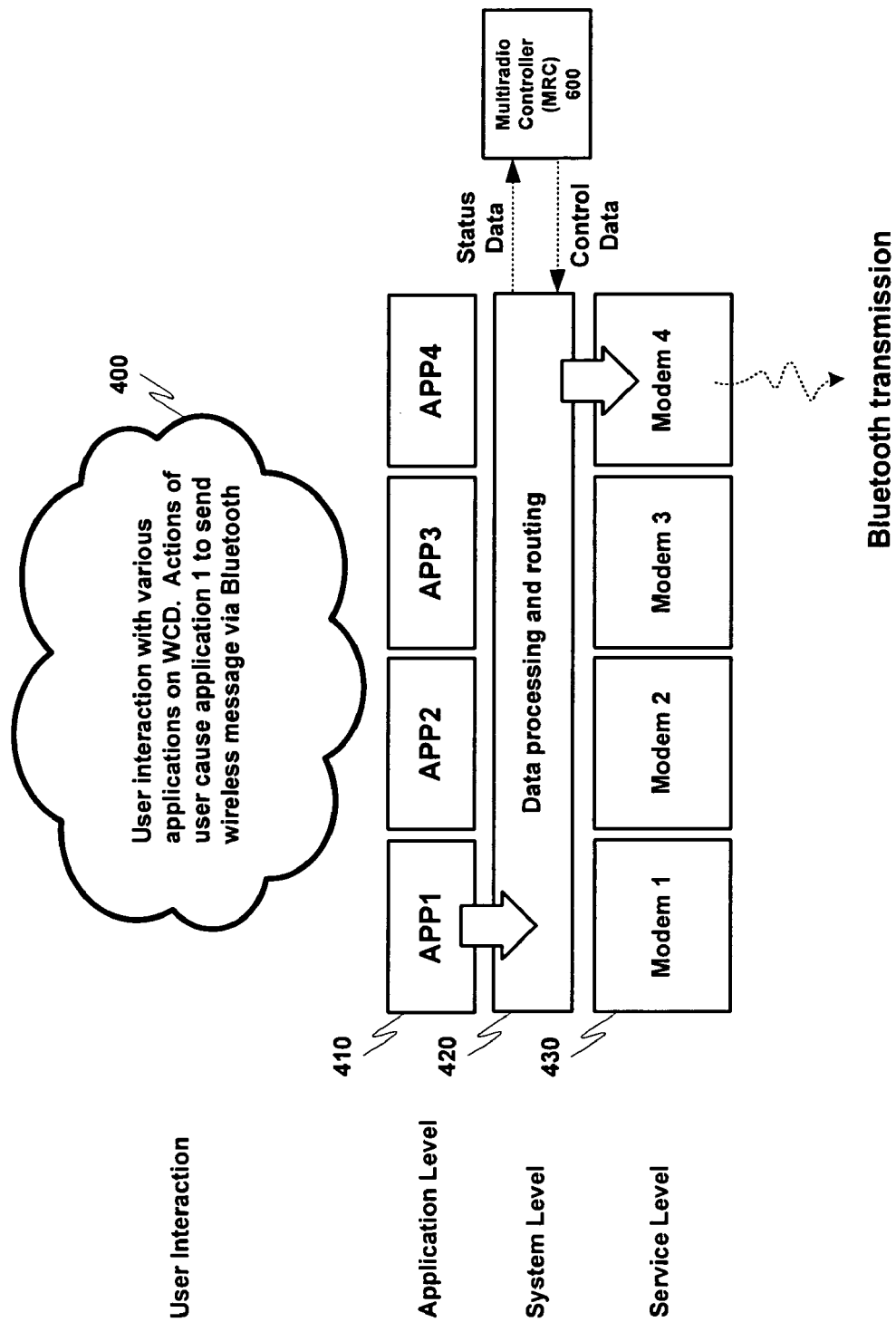
FIG. 6C discloses an exemplary operational description of a wireless communication device including a multiradio controller in accordance with at least one embodiment of the present invention.

FIG. 6C discloses an operational diagram similar to FIG. 4 including the effect of MRC 600. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communications devices in service level 430 and MRC 600 must all share the same communications system, delays may occur when all aspects of WCD 100 are trying to communicate on the common interface system 620. As a result, delay sensitive information regarding both communication resource status information and radio modem 610 control information may become delayed, nullifying any beneficial effect derived from MRC 600. Therefore, a system better able to handle the differentiation and routing of delay sensitive information is required if the beneficial effect of communication device activity coordination is to be realized.

V. A Wireless Communication Device Including a Distributed Multiradio Control System.

FIG. 7A discloses an exemplary embodiment of the present invention, wherein multiradio control system (MCS) 700 is introduced into WCD 100. Similar to MRC 600 described above, MCS 700 manages wireless communications in WCD 100 by monitoring for potential communication collisions and controlling communication resources, such as radio modems 610, in order to avoid these problems. However, MCS 700 may be deemed to provide an advantage over a centralized MRC 600 by distributing these control features into already necessary components within WCD 100. As a result, a substantial amount of the communication management operations may be localized to the various communication resources, such as radio modems 610, reducing the overall amount of control command traffic in WCD 100.

MCS 700 may be implemented utilizing a variety of bus structures, including the I²C interface commonly found in portable electronic devices, as well as emerging standards such as SLIMbus that are now under development. I²C is a multi-master bus, wherein multiple devices can be connected to the same bus and each one can act as a master by initiating a data transfer. An I²C bus contains at least two communication lines, an information line and a clock line. When a device has information to transmit, it assumes a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's I²C and I²S interfaces while offering more features and requiring the same or less power than the two combined.

MCS 700 directly links distributed control components 702 in modules 310, 312, 320 and 340. Another distributed control component 704 may reside in master control system 640 of WCD 100. It is important to note that distributed control component 704 shown in processor 300 is not limited only to this embodiment, and may reside in any appropriate system module within WCD 100. The addition of MCS 700 provides a dedicated low-traffic communication structure for carrying delay sensitive information both to and from the various distributed control components 702.

Figure 7B:
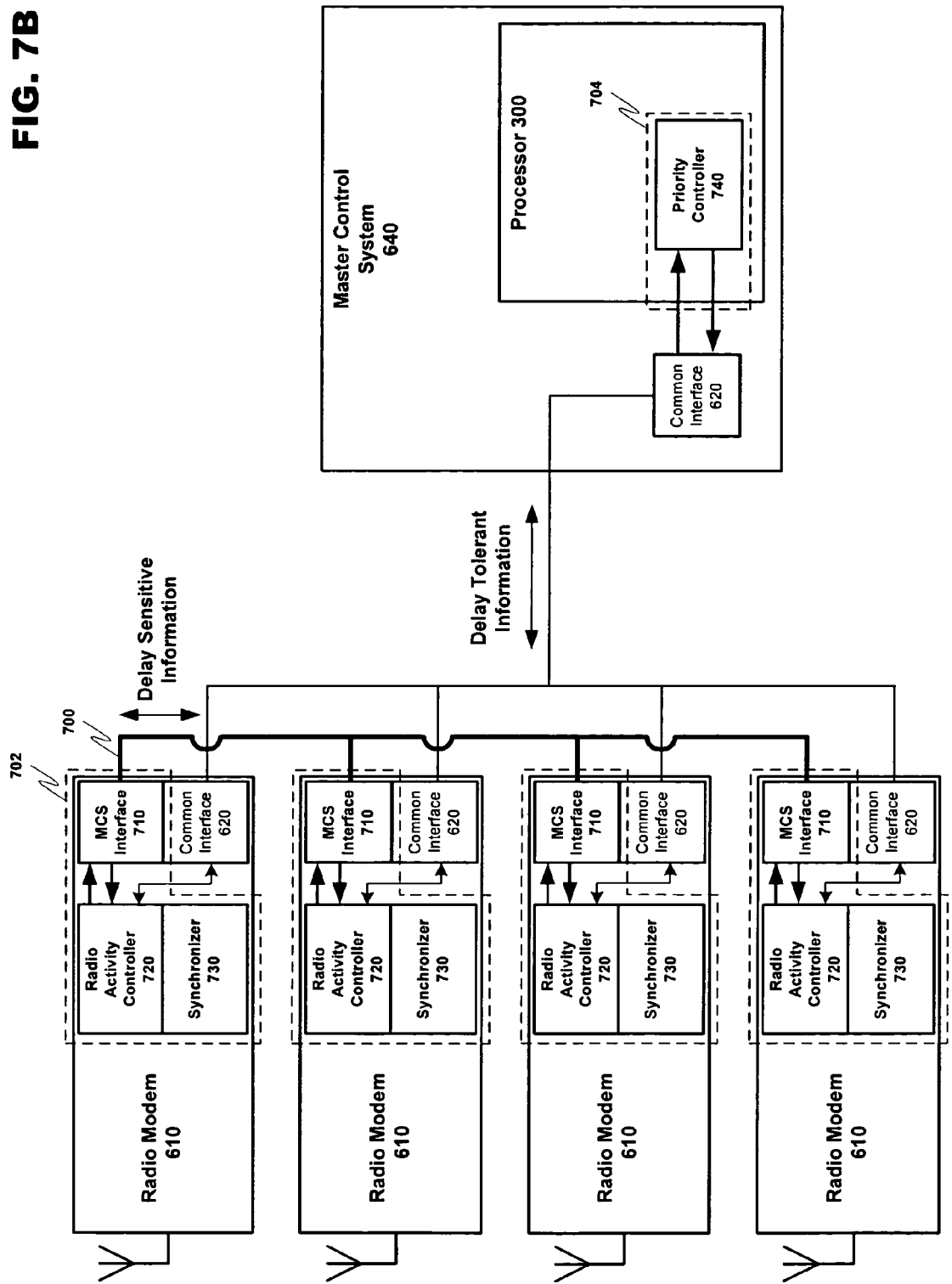
FIG. 7B discloses a more detailed structural diagram of FIG. 7A including the multiradio control system and the radio modems.

The exemplary embodiment disclosed in FIG. 7A is described with more detail in FIG. 7B. MCS 700 forms a direct link between distributed control components 702 within WCD 100. Distributed control components 702 in radio modems 610 may, for example, consist of MCS interface 710, radio activity controller 720 and synchronizer 730. Radio activity controller 720 uses MCS interface 710 to communicate with distributed control components in other radio modems 610. Synchronizer 730 may be utilized obtain timing information from radio modem 610 to satisfy synchronization requests from any of the distributed control components 702. Radio activity controller 702 may also obtain information from master control system 640 (e.g., from distributed control component 704) through common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, a running software routine that monitors and coordinates the behavior of radio activity controllers 720. Processor 300 is shown to contain priority controller 740. Priority controller 740 may be utilized to monitor active radio modems 610 in order to determine priority amongst these devices. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 activate/deactivate, and therefore, does not frequently change during the course of an active communication connection in radio modems 610. As a result, this information may be conveyed to radio modems 610 using common interface system 620 in at least one embodiment of the present invention.

Figure 7C:
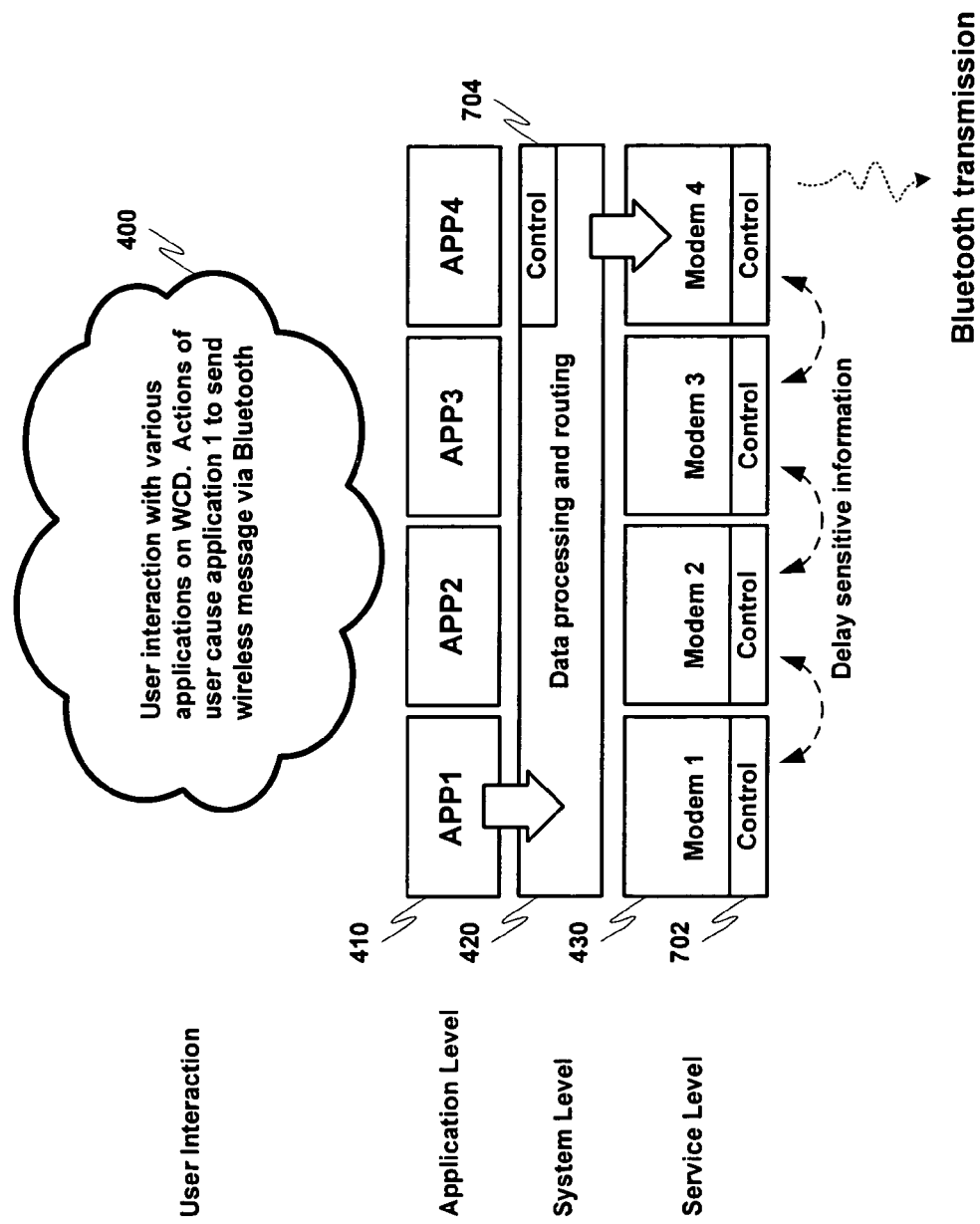
FIG. 7C discloses an exemplary operational description of a wireless communication device including a multiradio control system in accordance with at least one embodiment of the present invention.

At least one effect of MCS 700 is seen in FIG. 7C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when a radio modem is actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem settings during transmission, such as due to wireless handover or handoff.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in BT (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

The radio modem activity control is based on the knowledge of when the active radio modems 610 are about to transmit (or receive) in the specific connection mode in which the radios are currently operating. The connection mode of each radio modem 610 may be mapped to the time domain operation in their respective radio activity controller 720. As an example, for a GSM speech connection, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 μs, followed by an empty slot after which is the reception slot of 577 μs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. When the active radio modem 610 is about to transmit (or receive) it must check every time whether the modem activity control signal from its respective radio activity controller 720 permits the communication. Radio activity controller 720 is always either allowing or disabling the transmission of one full radio transmission block (e.g. GSM slot).

VI. A Wireless Communication Device Including an Alternative Example of a Distributed Multiradio Control System.

Figure 8A:
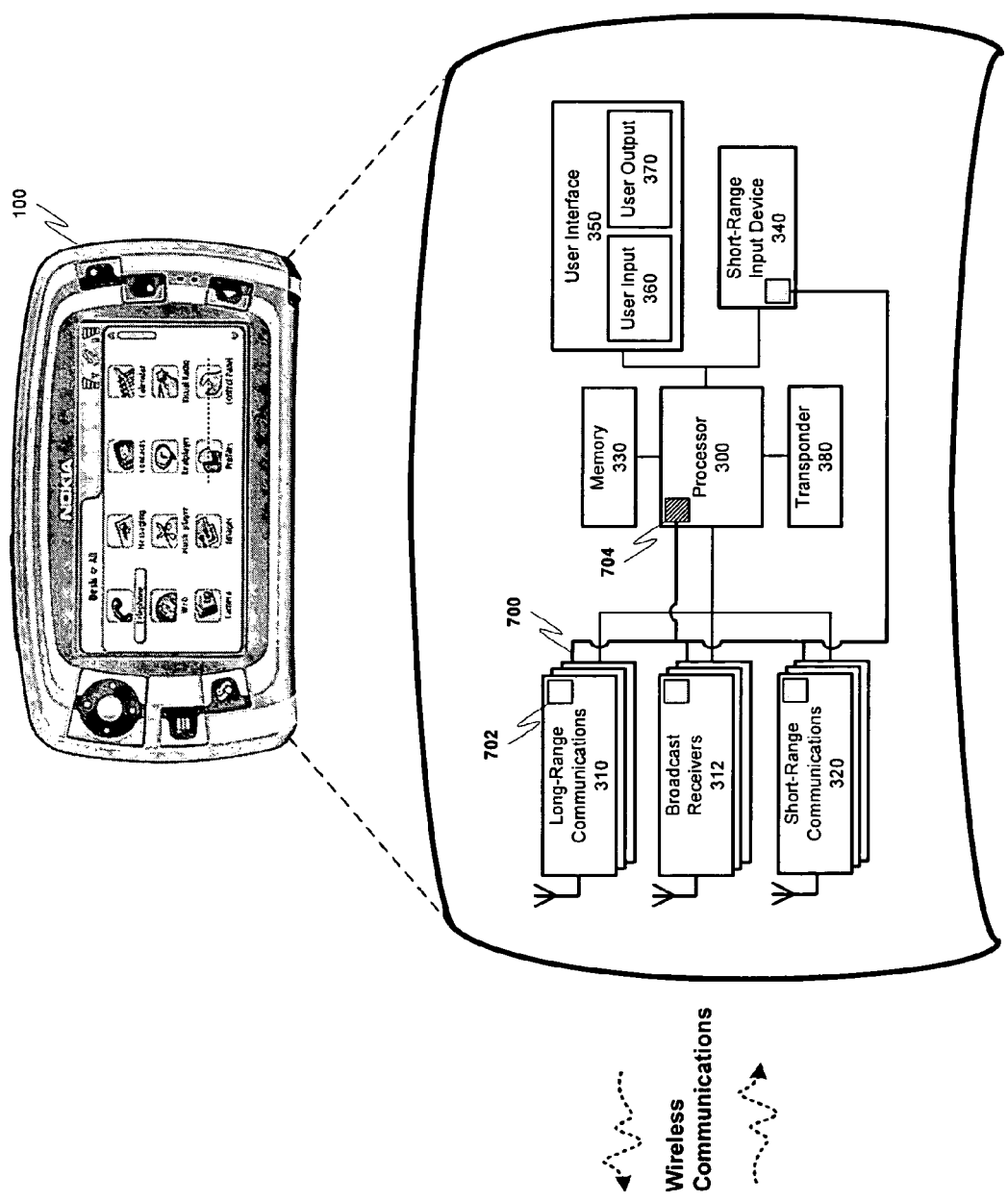
FIG. 8A discloses an exemplary structural description of a wireless communication device including a multiradio control system in accordance with an alternative embodiment of the present invention.
Figure 8B:
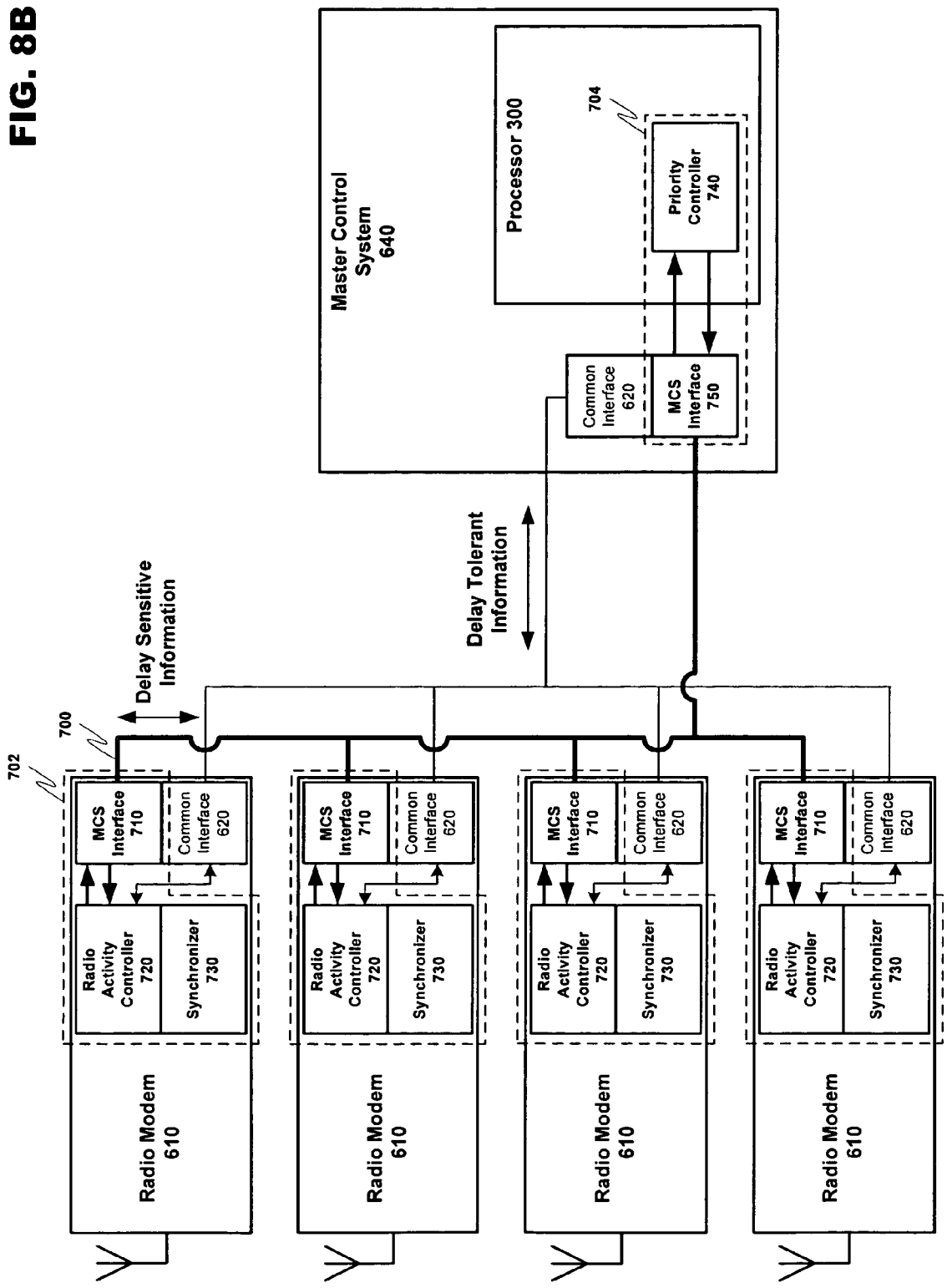
FIG. 8B discloses a more detailed structural diagram of FIG. 8A including the multiradio control system and the radio modems.
Figure 8C:
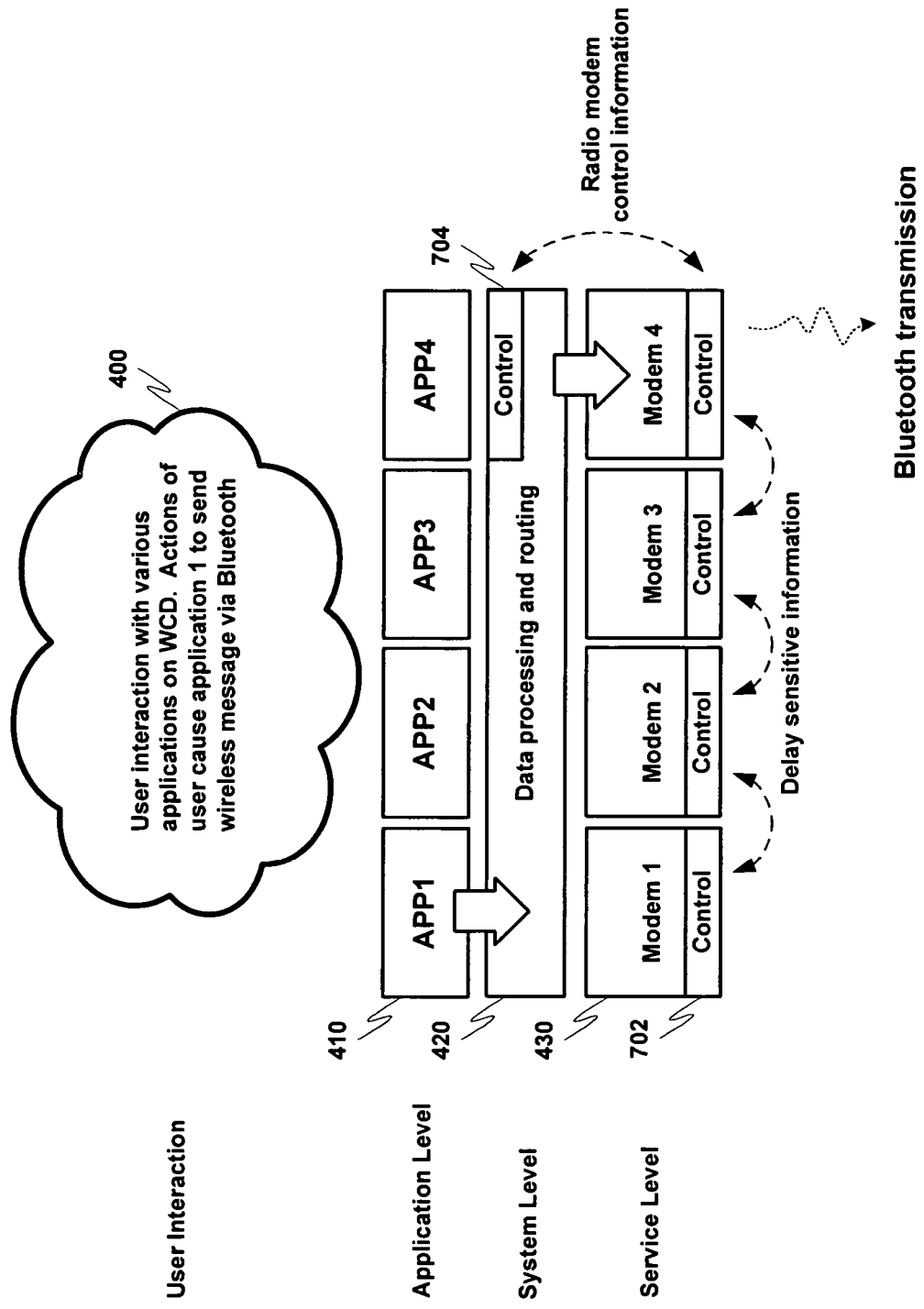
FIG. 8C discloses an exemplary operational description of a wireless communication device including a multiradio control system in accordance with the alternative embodiment of the present invention disclosed in 8A.

An alternative exemplary embodiment of the present invention is disclosed in FIG. 8A-8C. In FIG. 8A, distributed control components 702 continue to be linked by MCS 700. However, now distributed control component 704 is also directly coupled to distributed control components 702 via an MCS interface. As a result, distributed control component 704 may also utilize and benefit from MCS 700 for transactions involving the various communications components of WCD 100.

Referring now to FIG. 8B, the inclusion of distributed control component 704 onto MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communications between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. Another benefit may be realized in communication control flexibility in WCD 100. New features may be introduced into priority controller 740 without worrying about whether the messaging between control components will be delay tolerant or sensitive because an MCS interface 710 is already available at this location.

FIG. 8C discloses the operational effect of the enhancements seen in the current alternative embodiment of the present invention on communications in WCD 100. The addition of an alternative route for radio modem control information to flow between distributed control components 702 and 704 may both improve the communications management of radio activity controllers 720 and lessen the burden on master control system 640. In this embodiment, all distributed control components of MCS 700 are linked by a dedicated control interface, which provides immunity to communication coordination control messaging in WCD 100 when the master control system 640 is experiencing elevated transactional demands.

Figure 9:
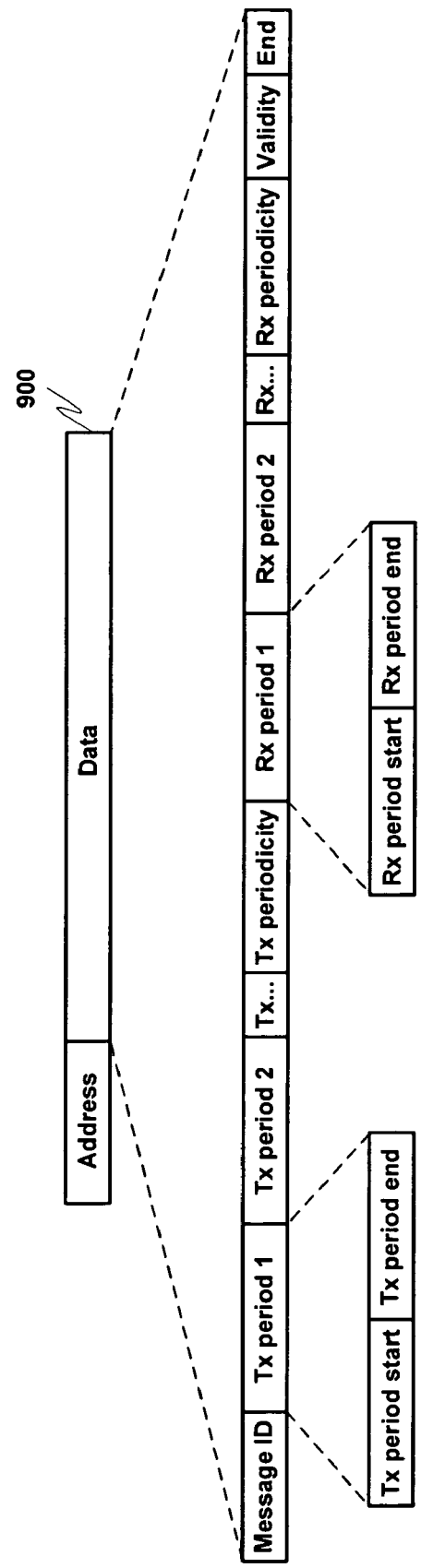
FIG. 9 discloses an exemplary information packet usable with at least one embodiment of the present invention.

An example message packet 900 is disclosed in FIG. 9. Example message packet 900 includes activity pattern information that may be formulated by radio activity controller 720. The data payload of packet 900 may include at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed nature of MCS 700 may allow radio modem control activity to be controlled real-time (e.g., more control messages with finer granularity), the ability to include multiple allowed/disallowed periods into a single message packet 900 may support radio activity controllers 720 in scheduling radio modem behavior for longer periods of time, which may result in a reduction in message traffic. Further, changes in radio modem 610 activity patterns may be amended using the validity information in each message packet 900.

The modem activity control signal (e.g., packet 900) may be formulated by radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based one of at least two standards. In a first example, a transmission period may start after a pre-defined amount of synchronization events have occurred in radio modem 610. Alternatively, all timing between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a time standard, a conversion to modem clock timing must necessarily be implemented whenever a new activity pattern is put into use in radio modem 610.

The activity period may be indicated as start and stop times. If there is only one active connection, or if there is no need to schedule the active connections, the modem activity control signal may be set always on allowing the radio modems to operate without restriction. The radio modem 610 should check whether the transmission or reception is allowed before attempting the actual communication. The activity end time can be used to check the synchronization. Once the radio modem 610 has ended the transaction (slot/packet/burst), it can check whether the activity signal is still set (it should be due to margins). If this is not the case, the radio modem 610 can initiate a new synchronization with radio activity controller 720 through synchronizer 730. The same happens if a radio modem time reference or connection mode changes. A problem may occur if radio activity controller 720 runs out of the modem synchronization and starts to apply modem transmission/reception restrictions at the wrong time. Due to this, modem synchronization signals need to be updated periodically. The more wireless connections that are active, the more accurate the synchronization information needs to be.

Figure 10:
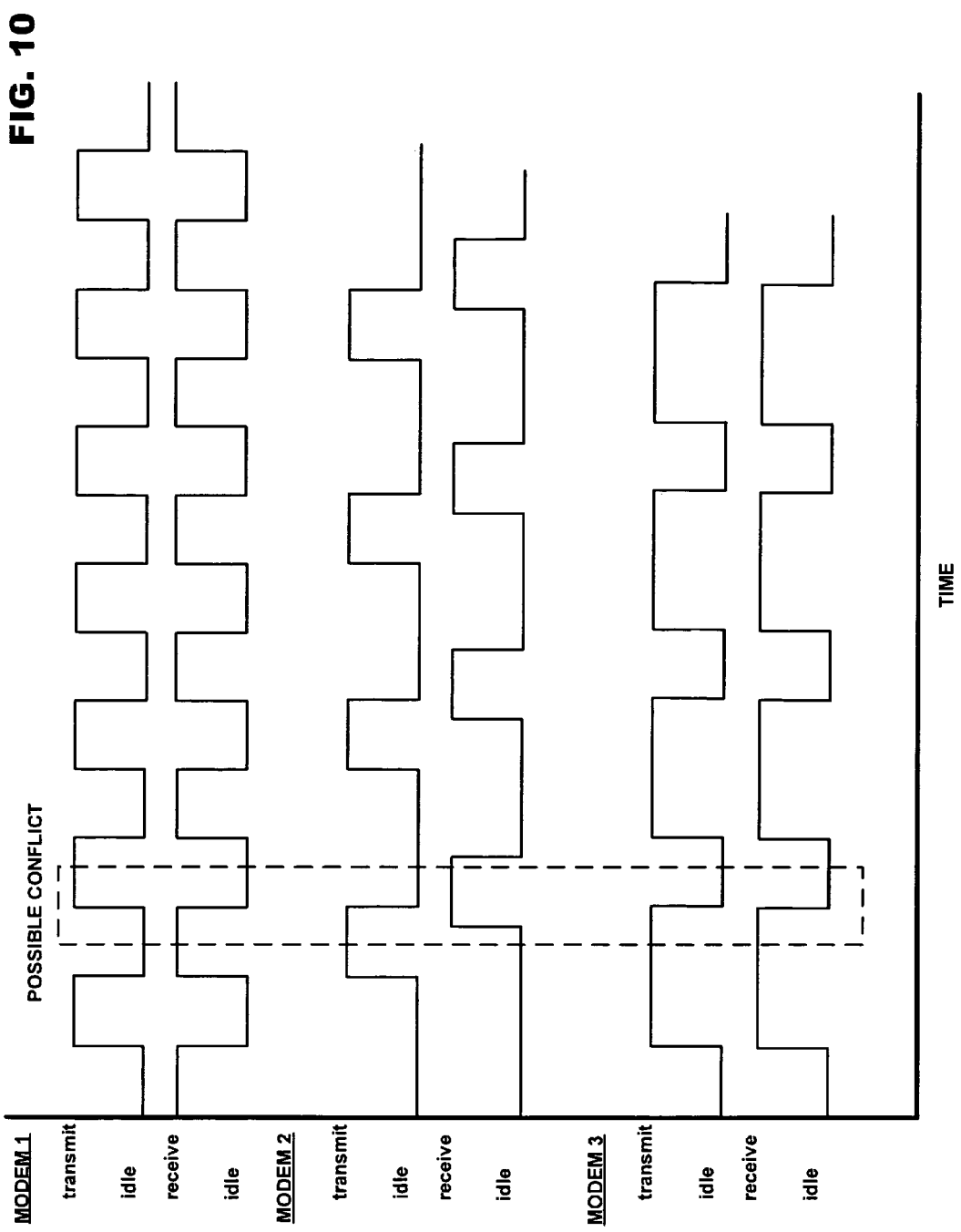
FIG. 10 discloses exemplary timing diagrams for wireless radio modems usable with the present invention.

FIG. 10 discloses a pictorial example of timing patterns between various active radio modems 610. Modems 1, 2 and 3 all have individual patterns that indicate when a modem is actively transmitting and/or receiving information. One example of a period wherein a possible conflict exists in highlighted in the figure. At this point, one or more radio activity controllers 720 may act to control their respective radio modems 610 in order to avoid the conflict. If the activity is to be restricted, radio activity controllers 720 may configure the modem activity control message so that activity is always denied when radio modem 610 is not allowed to transmit or receive. The restriction can last either the whole period or just an individual transmission/reception instance. In the latter case, the activity can be allowed for some other transactional instance inside the period and the radio modem can utilize this to transmit (e.g. to attempt retransmission).

The radio modem 610 can indicate to radio activity controller 720 the radio activity periods that were blocked due to the modem activity control message. This additional communication can be as a safety procedure to ensure that radio activity controller 720 is not continuously blocking the communications due to off synchronization conditions. The radio modem 610 can switch off the transmitter/receiver every time the modem activity control signal is not allowing communication. Because the modem activity control signal is transmitted in advance and it is typically remaining the same for a while, radio modem 610 can prepare its operations in advance according to the activity control signal. Inside the validity parameter in the activity control message is a field describing whether the new message is replacing or added to the existing activity periods.

FIG. 11 includes an example of a process wherein MCS 700 collectively monitors active radio modems 610 and implements scheduling in order to avoid conflicts. In step 1100, processor 300 monitors radio activity controllers 720 for indications of new modem activations. This monitoring may be performed by a software routine running, for example, as priority controller 740. When processor 300 receives notification of a new radio modem 610 activation (step 1102), priority controller 740 may also receive information from radio activity controller 720 indicating identification and status information in step 1104. For example, this information may identify the medium of communication for radio modem 610, whether the modem is transmitting and/or receiving, the application using the modem, synchronization information, etc. Priority controller 740 uses this information to determine a relative priority between all active radio modems 610, and updates the radio activity controllers 720 for these modems in step 1106. The update information may inform radio activity controller 720 of a priority in regard to other active modems (e.g., a radio modem 610 takes precedent over all other communications) or it may deliver rules governing a conflict between two modems. For example, a rule may dictate that an incoming GSM voice communication will immediately be top priority over all other conflicting wireless mediums unless the other conflicting transmission is coming from a designated application, the communication is more than 50% complete, etc. In step 1108 the various radio activity controllers 720 may communicate with each other via MCS interfaces 710 or common interface 620 in order to confirm relative priority with other controllers.

Any new activation of a radio modem 610 will be detected by priority controller 740 in step 1110, and as a result the previous process may be executed. Alternatively, in step 1112, radio actively controllers 720 may request modem timing information from their respective synchronizer 730, and further, may request modem timing information from other radio activity controllers 720. Accurate timing information becomes essential when trying to avoid a potential conflict detected in step 1114. If a potential conflict is detected in step 1116, one or more of radio activity controllers 720 may utilize the rules and/or priority information provided by priority controller 740 to determine a schedule for radio modem operation in step 1118. Depending on these priorities or rules, the operational schedules of one or more modems may be adjusted to avoid conflicts. The schedule is then used in step 1120 to determine if a radio modem 610 should be active for the current time period. If the schedule permits, a radio modem 610 is allowed to continue communication in step 1122. Otherwise, activity controller 720 may temporarily halt modem communication activity in step 1124 for the duration determined in the schedule, and then resumes communication in step 1126. In step 1128, all radio activity controllers 740 may determine if a change in the operations of their respective radio modem 610, or other conditions have occurred, to warrant a resynchronization with the radio modem 610 through synchronizer 730. If no resynchronization is required, then conflict monitoring may resume at step 1114.

The present invention is an improvement over the state of the art. The multipoint control system of the present invention allows a device with a plurality of active radio modems to efficiently manage communications between these modems in order to avoid potential communication conflicts. This scheduling of wireless communication resources allows a wireless communication device to function in a fully enabled mode without experiencing communication quality degradation due to the constant retransmission of lost packets. The result is a fully enabled wireless communication device that satisfies user expectations because interactivity does not suffer as the device is fully deployed in more complex applications.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A device, comprising:
 a master control system configured to control the general operation of a device;
 a plurality of radio modems; and
 a multiradio control system configured to concurrently manage the plurality of radio modems, the multiradio control system including:
  distributed control components, incorporated within at least the master control system and the plurality of radio modems, configured to control operation of the plurality of radio modems based on delay tolerant information including radio modem configuration information that does not change during a virtual radio modem connection and delay sensitive information including at least information related to radio modem clock synchronization and radio modem activity control containing at least one or more allowed/disallowed communication periods for a radio modem; and
  multiradio control system interface modules, coupled to at least some of the distributed control components, configured to relay the delay sensitive information between the distributed control components through a direct physical interface dedicated for providing fast connection for communicating delay sensitive information.

2. The device of claim 1, wherein the multiradio control system interface modules are coupled to the distributed control components incorporated within the plurality of radio modems.

3. The device of claim 1, wherein the distributed control components incorporated within the plurality of radio modems include at least a radio activity controller and a synchronizer.

4. The device of claim 3, wherein at least one each of the radio activity controller, the synchronizer and the multiradio control system interface module are integrated within each of the plurality of radio modems.

5. The device of claim 1, wherein the distributed control component incorporated within the master control system includes at least a priority controller.

6. The device of claim 1, wherein any or all of the distributed control components determine whether received information is delay sensitive or delay tolerant information.

7. The device of claim 1, wherein one or more of the distributed control components, alone or in combination, use the delay sensitive information and the delay tolerant information to schedule any or all of the plurality of radio modems in order to avoid communication conflicts between actively communicating radio modems.

8. The device of claim 1, wherein one or more of the distributed control components request synchronization data from any or all of the plurality of radio modems through the multiradio control system interface modules.

9. The device of claim 1, wherein commands are issued by one or more of the distributed control components, the commands being enable or disable instructions for temporarily changing the behavior of any or all of the plurality of radio modems.

10. The device of claim 1, wherein all of the distributed control components are coupled to multiradio control system interface modules.

11. The device of claim 1, wherein the device is at least one of a cellular telephone, a personal digital assistant or a palm-top computer.

12. A method, comprising:
controlling the general operation of a device with a master control system;
concurrently managing a plurality of radio modems with a multiradio control system, the multiradio control system including:
distributed control components, incorporated within at least the master control system and the plurality of radio modems, configured to control operation of the plurality of radio modems based on delay tolerant information including radio modem configuration information that does not change during a virtual radio modem connection and delay sensitive information including at least information related to radio modem clock synchronization and radio modem activity control containing at least one or more allowed/disallowed communication periods for a radio modem; and
multiradio control system interface modules, coupled to at least some of the distributed control components, configured to relay the delay sensitive information between the distributed control components through a direct physical interface dedicated for providing fast connection for communicating delay sensitive information.

13. The method of claim 12, wherein any or all of the distributed control components determines whether received information is delay sensitive or delay tolerant information.

14. The method of claim 12, wherein one or more of the distributed control components, alone or in combination, use the delay sensitive information and the delay tolerant information to schedule any or all of the plurality of radio modems in order to avoid communication conflicts between actively communicating radio modems.

15. The method of claim 12, wherein one or more of the distributed control components request synchronization data from any or all of the plurality of radio modems through the multiradio control system interface modules.

16. The method of claim 12, wherein commands are issued by one or more of the distributed control components, the commands being enable or disable instructions for temporarily changing the behavior of any or all of the plurality of radio modems.

17. A computer program product comprising computer executable program code recorded on a computer readable storage medium, the computer executable program code comprising:
code configured to control the general operation of a device with a master control system;
code configured to concurrently manage a plurality of radio modems with a multiradio control system, the multiradio control system including:
distributed control components, incorporated within at least the master control system and the plurality of radio modems, configured to control operation of the plurality of radio modems based on delay tolerant information including radio modem configuration information that does not change during a virtual radio modem connection and delay sensitive information including at least information related to radio modem clock synchronization and radio modem activity control containing at least one or more allowed/disallowed communication periods for a radio modem; and
multiradio control system interface modules, coupled to at least some of the distributed control components, configured to relay the delay sensitive information between the distributed control components through a direct physical interface dedicated for providing fast connection for communicating delay sensitive information.

18. The computer program product of claim 17, wherein any or all of the distributed control components determine whether received information is delay sensitive or delay tolerant information.

19. The computer program product of claim 17, wherein one or more of the distributed control components, alone or in combination, use the delay sensitive information and the delay tolerant information to schedule any or all of the plurality of radio modems in order to avoid communication conflicts between actively communicating radio modems.

20. The computer program product of claim 17, wherein one or more of the distributed control components request synchronization data from any or all of the plurality of radio modems through the multiradio control system interface modules.

21. The computer program product of claim 17, wherein commands are issued by one or more of the distributed control components, the commands being enable or disable instructions for temporarily changing the behavior of any or all of the plurality of radio modems.

22. A system, comprising:
a device;
a master control system contained within the device for controlling general operation;

a plurality of radio modems contained within the device; and a multiradio control system contained within the device for concurrently managing the plurality of radio modems, the multiradio control system including:

distributed control components, incorporated within at least the master control system and the plurality of radio modems, configured to control operation of the plurality of radio modems based on delay tolerant information including radio modem configuration information that does not change during a virtual radio modem connection and delay sensitive information including at least information related to radio modem clock synchronization and radio modem activity control containing at least one or more allowed/disallowed communication periods for a radio modem; and multiradio control system interface modules, coupled to at least some of the distributed control components, configured to relay the delay sensitive information between the distributed control components through a direct physical interface dedicated for providing fast connection for communicating delay sensitive information.

23. The system of claim 22, wherein the multiradio control system interface modules are coupled to the distributed control components incorporated within the plurality of radio modems.

24. The system of claim 22, wherein all of the distributed control components are coupled to multiradio control system interface modules.

25. The system of claim 22, wherein one or more of the distributed control components, alone or in combination, use the delay sensitive information and the delay tolerant information to schedule any or all of the plurality of radio modems in order to avoid communication conflicts between actively communicating radio modems.

26. A chipset, comprising:

a plurality of distributed control components coupled to a communication interface;

the communication interface being composed of a plurality of interface modules, coupled to at least some of the plurality of the distributed control components, wherein the interface modules relay delay sensitive information including at least information related to radio modem clock synchronization and radio modem activity control containing at least one or more allowed/disallowed communication periods for a radio modem between the distributed control components through a direct physical interface dedicated for providing fast connection for communicating delay sensitive information.

27. The chipset of claim 26, wherein the communication interface isolates the delay sensitive information from other information communicated by the plurality of distributed control components through a master control system of the terminal device.

28. The chipset of claim 26, wherein the interface is based on an $I^2C$ bus structure.

29. The chipset of claim 26, wherein the interface is based on a SLIMbus bus structure.

* * * * *